INVENTOR.
EDWARD A. SWEENEY
BY
Morgan, Finnegan, Durham & Pine
ATTORNEYS

INVENTOR.
EDWARD A. SWEENEY ary Sept. 20, 1971

United States Patent Office 3,605,362
Patented Sept. 20, 1971

3,605,362
CONNECTION SYSTEM FOR RELIEVING STRESS IN CONCRETE STRUCTURES
Edward A. Sweeney, Everett, Mass., assignor to Stone & Webster Engineering Corporation, Boston, Mass.
Filed June 10, 1969, Ser. No. 831,846
Int. Cl. E02d 27/38; F16j 11/00; G21g 13/02
U.S. Cl. 52—224                              1 Claim

ABSTRACT OF THE DISCLOSURE

A structural connection assembly of steel reinforcing bars and concrete adapted to relieve shear and bending stresses which are developed at geometric discontinuities in a concrete vessel structure and the method of fabricating this assembly. The wall of the vessel is comprised of a foundation section and an upper wall section with a zone of separation therebetween. The reinforcing bars extend from the foundation section to the upper wall section and transmit all loads through the zone of separation. Alternatively, the vessel dead weight load may be wholly or partly taken by a bearing. Cavities of a designed cross section and length are provided to allow for deflection of the reinforcing steel within this length.

FIELD OF THE INVENTION

The present invention relates to structural assemblies. More specifically, the present invention relates to structural assemblies comprised of a plurality of components wherein one component deflects elastically to a self-limiting degree relative to another component to which it is connected. The present invention has particular application in structures formed of reinforced or prestressed concrete. The invention has been found to be suitable for use in vessel and tank construction and especially suitable for the connection of reinforced concrete nuclear power reactor containment vessel walls to their supporting foundation mat.

BACKGROUND OF THE INVENTION

Description of the prior art

Discontinuity stresses are developed in all pressure vessels that are not spherical. The greater the deviation from the spherical configuration, the more severe the discontinuity stresses. A particularly critical area for the development of discontinuity stresses is the right angle intersection of a cylindrical or conical wall and a plane surface, such as is commonly found in nuclear power plant containment vessels.

Nuclear reactors are housed in containment systems which include a vessel structure often comprised of reinforced concrete walls which functions as both a biological shield and a pressure vessel. The concrete containment vessel is subjected to high internal pressure during accident conditions which causes the walls thereof to elastically expand radially and vertically.

The containment vessels often have cylindrical vertical walls with a hemispherical or paraboloidal top. The bottom is usually a flat foundation mat that supports the vessel on the underlying substrata.

A particularly critical area of discontinuity membrane stress development is at the connection of the cylindrically shaped containment walls to the flat mat. Extremely large stress concentrations occur at the connection of the wall and the mat when the containment wall is subjected to the internal pressure that attends the failure of the nuclear steam supply system.

At present, there are two basic types of connections to secure concrete containment walls to the foundation mat, the fixed base connection and the semi-rigid connection.

In a fixed base connection, very large shear and bending stresses are developed. Therefore, steel must be used to resist these stresses and must be carefully spaced in the critical connection area. Since the connection area is very confined, time and labor costs are greatly magnified.

Semi-rigid containment wall connections for prestressed containments comprise walls which rest on a flexible base material and which are maintained in a fixed lateral position by radially extending tie bars anchored to the building mat. This design affords rotation of the wall about a fixed circumference by preventing radial translation of the base of the wall. With the semi-rigid connection the shear and bending moment stress concentrations generated at the base by internal pressure are less than that in the fully fixed connection. However, the stress concentrations that do result are of sufficient magnitude to require considerable expensive reinforcement.

SUMMARY OF THE INVENTION

It is, therefore, an object of the present invention to provide a structural assembly for concrete members in general and concrete containment walls in particular.

It is a particular object of the present invention to connect reinforced concrete or prestressed concrete assemblies in which one component will deflect elastically to a self-limiting degree relative to another component to which it is connected for the purpose of transmitting loads in another plane thereby virtually eliminating shear stresses normal to the connecting members.

It is another object of the present invention to provide a structural assembly for a containment vessel comprised of an array of reinforcement bars embedded in a concrete mat or foundation section at one end and the containment wall on the other end.

To this end, a structural connection assembly comprised of an array of reinforcing bars is provided. One end of each of the reinforcing bars is embedded in a concrete mat or foundation section. The opposite end is embedded in the upper section of the concrete wall. The space between the embedded ends effect a zone of separation of the concrete.

Sleeves designed to have an inside diameter a finite amount larger than the reinforcing bars are arranged around the reinforcing bars to enable unrestrained deflection of the reinforcing bars when subjected to lateral movement caused by the radial elastic deflection of the wall. A seal or liner is arranged on the inner surface of the concrete wall to insure tightness of the vessel at the zone of separation.

The connection assembly as used for a reinforced concrete containment vessel is constructed by first strategically placing in the mat or foundation section reinforcing bars and then placing concrete. Next, outside and inside wall forms are erected. If a liner plate is used, the liner plate can serve as the inside form member. A temporary base of sand or other suitable filler material is next placed about the vertical reinforcing steel and over the concrete mat. The height of the filler material will determine the height of the opening between the mat or foundation section and the wall section. Sleeves are then placed over each of the vertical reinforcement bars and means are provided at the top of each sleeve to seal the interior of each sleeve to prevent intrusion of concrete. The sleeves are positioned with respect to the reinforcing steel and mechanically anchored in place prior to placing the wall concrete. The lower end of the sleeve may be anchored by placing a thin layer of concrete over the layer of sand to securely fix the sleeves prior to placing the concrete wall section. Alternatively, a mechanical type of anchorage can be used to fix the sleeves in position. Horizontal wall reinforcement bars and any other embedded items are then placed appropriately within the wall form. Concrete is then placed in the form to provide the wall section. Finally, the forms are stripped and the sand, if used, may be removed from the area between the mat or foundation member and the wall. With this procedure, a structural assembly results wherein vertical reinforcement bars react the entire axial internal pressure force on a concrete wall and radial shear forces are virtually eliminated.

DESCRIPTION OF DRAWINGS

The invention will be better understood and its advantages and specific purposes will become apparent with reference to the accompanying drawings wherein.

DESCRIPTION OF THE PREFERRED EMBODIMENT

The present invention is directed to a structural assembly in general. The structural assembly of the subject invention is particularly suited for connecting a reinforced concrete containment wall used in a nuclear reactor containment system to its supporting mat.

Figure 1:
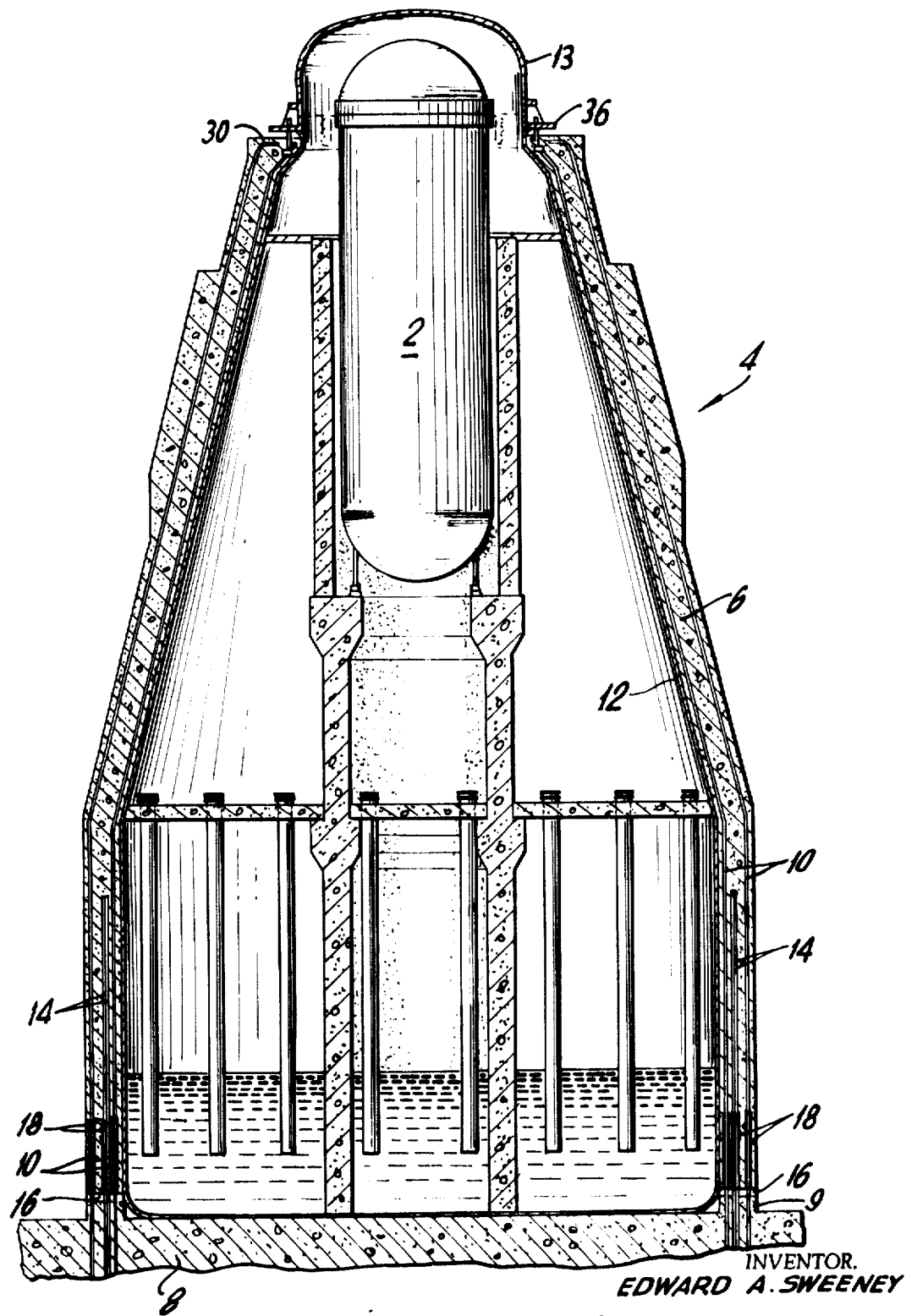
FIG. 1 is a sectional elevational view of a pressure suppression nuclear reactor containment system embodying the connection system of the present invention.

As seen in FIG. 1, a nuclear reactor 2 is shown with a primary containment system 4. The primary containment system 4 comprises a concrete containment wall 6, having a generally cylindrical shape, and a concrete mat 8. Basically, the mat 8 serves as part of the containment system and acts to support the containment wall 6 and anchor the reinforcing rods 10 that support and strengthen the concrete containment wall 6.

The inside surface of the concrete containment wall 6 is lined with a gas or vapor impervious membrane 12, usually of steel plate which for this design in anchored to a removable drywell head 13 arranged over the top of the vessel 2. The membrane 12 also covers the top of the foundation mat 8 inside the containment wall 6 to provide a continuous or essentially continuous liner for the containment vessel.

Figure 2:
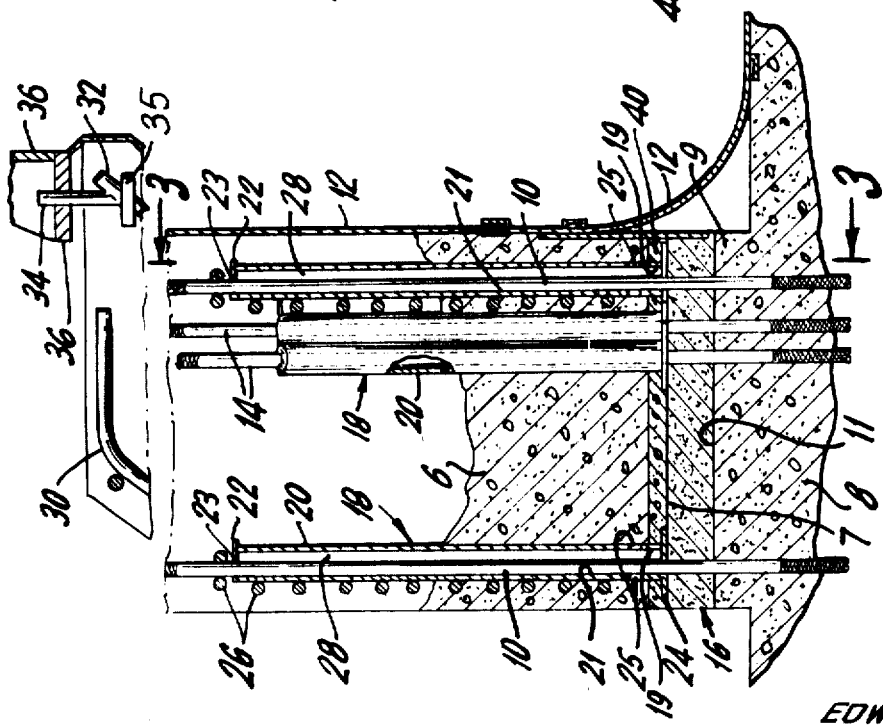
FIG. 2 is a sectional view of the containment wall embodying the present invention.

As best seen in FIG. 2, the structural assembly of the present invention is comprised of vertical reinforcement bars 10 and diagonal reinforcement bars 14 which are embedded in the mat 8 and the concrete containment wall 6. The mat 8 is formed with a curb or foundation section 9 which extends upwardly from the mat 8. The height of the foundation section 9 is a function of design considerations other than the internal pressure and may vary with each particular installation. A zone of separation 16 is located between the upper surface 11 of the foundation section 9 and the lower surface 7 of the concrete containment wall 6. The presence of a zone of separation 16 between the foundation section 9 and the containment wall 6 requires that all vertical loads imposed on the containment wall 6 be carried by the reinforcing bars 10 and 14. The height of the zone of separation will also vary with each installation.

Metal sleeves 18 are located in the containment wall 6 to form cavities 28 in which the reinforcement bars 10 and 14 can deflect as a function of the radial elastic deformation of the wall. The metal sleeves 18 are preferably formed of metal pipes and serve to prevent concrete from surrounding the lower section of the reinforcement bar. Essentially, the sleeves 18 are comprised of a section of pipe 20 sized larger than the cross section of the reinforcement bar, an upper cap 22 having an opening 23 and an external flange 24. The upper cap 22 is provided to prevent concrete from entering the interior of the sleeve 18 during the concrete placing operation. Hence, it has been found practical to seal the opening between the reinforcing bar and the cap 22 with tape or a similar material. An inspection hole 25 is also provided in the sleeves 16 to facilitate proper positioning of the sleeve during erection. The lower external flange member 24 is provided to afford a large surface area for the sleeve 18 to bear on the filler material and thereby prevent the sleeve 18 from penetrating into the filler material used to form opening 16 during the concrete placing operation. The edges 19 of the sleeves 18 which are nearest the interior of the containment vessel are a sufficient distance from the reinforcing bars 10 and 14 to allow unrestrained deflection of the bar 10 during radial expansion of the wall 6 with respect to the foundation section 9. In practice it has been found convenient to position the reinforcing bars 10 and 14 nearer the outer edge 21 of the sleeves 18 than the inner edge 19 to allow maximum uninhibited radial displacement of the wall 6 when the wall 6 is subjected to internal pressure.

The vertical rods 10 are also provided with termination means. The outer vertical rods 10 terminate in hooks 30 which extend inwardly into the concrete wall 6 to both lock the reinforcing bar 10 in place and provide additional reinforcement for the concrete wall 6. The inner vertically extending reinforcing bars 10 terminate in a ring 35 by appropriate attachment such as Cadwelds 32. Anchor bolts 34 extend vertically from the ring 35 to connect the reinforcing rods 10 to a drywell head anchor flange 36. The drywell head anchor flange 36 is attached directly to the drywell head 13, best seen in FIG. 1. Consequently, any internal pressurization acting on the drywell head 13 will be transmitted directly to the reinforcing rods 10.

In addition, horizontal bars 26 are provided in the concrete containment wall 6 to resist primary bursting forces (hoop tension).

Figure 3:
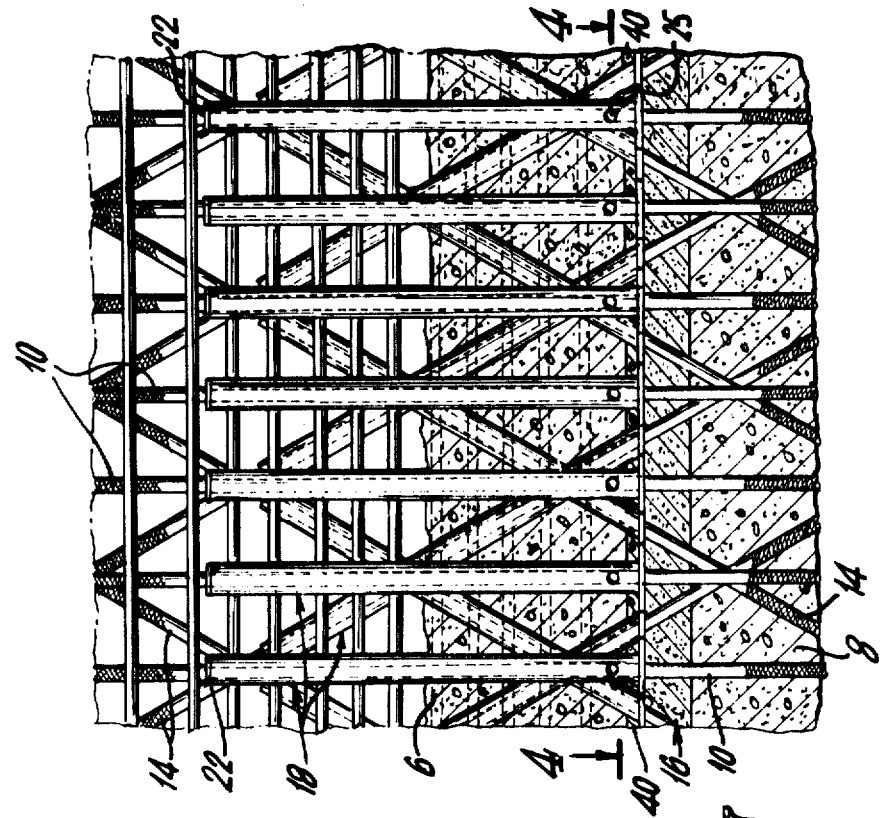
FIG. 3 is a sectional view through line 3—3 of FIG. 2.

As seen in FIG. 3, the diagonal reinforcing bars 14 are shown disposed at an angle to the foundation mat 8. The vertical reinforcement bars 10 are shown disposed perpendicular to the foundation mat 8. Basically, the vertical reinforcing bars 10 react essentially all of the vertical force. The diagonally extending bars 14 react tangential shear loads. For example, the loads imposed by earthquakes would be reacted by the diagonally extending reinforcing bars 14. The number of vertical and diagonal reinforcing bars 10 and 14; the sleeve cross section and length; and the open space 16 will vary depending upon design pressure and vessel geometry. Also, the number of horizontal reinforcing bars 26 used varies with each installation.

Figure 4:
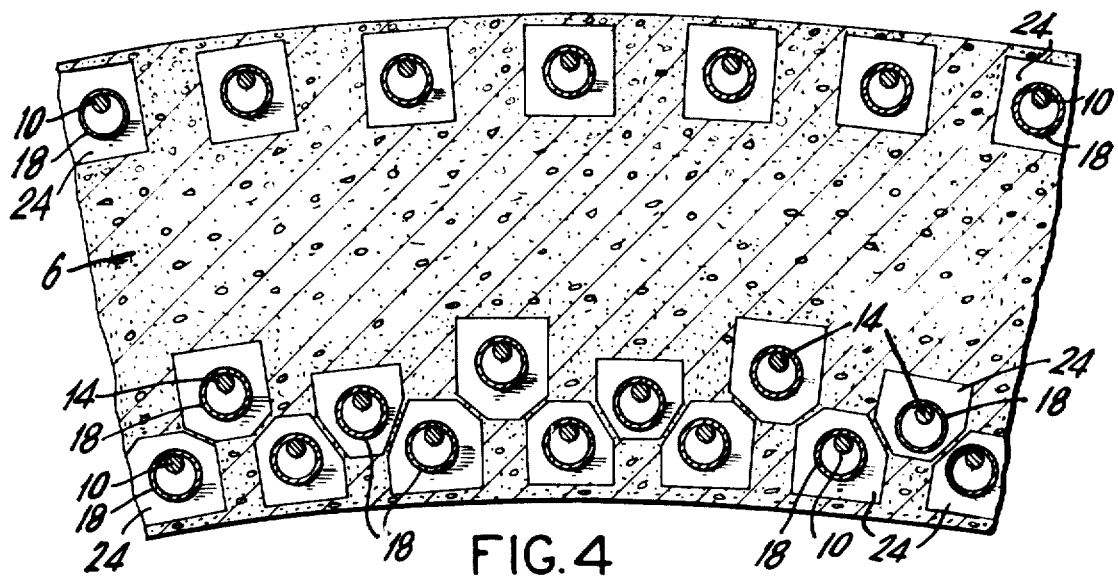
FIG. 4 is a sectional view through line 4—4 of FIG. 3.

The location of the vertical reinforcing bars 10 adjacent the outer and inner edges of the containment wall 6 and the location of the diagonal reinforcing bars 14 slightly inwardly from the inner row of reinforcing bars 10 is shown in FIG. 4. Again, the design is a function of each installation.

Figure 5:
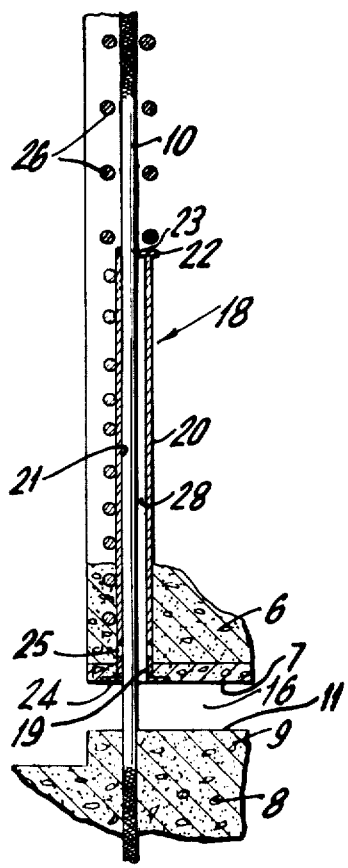
FIG. 5 is a side elevational view of a reinforcement bar of the present invention under a dead load.
Figure 6:
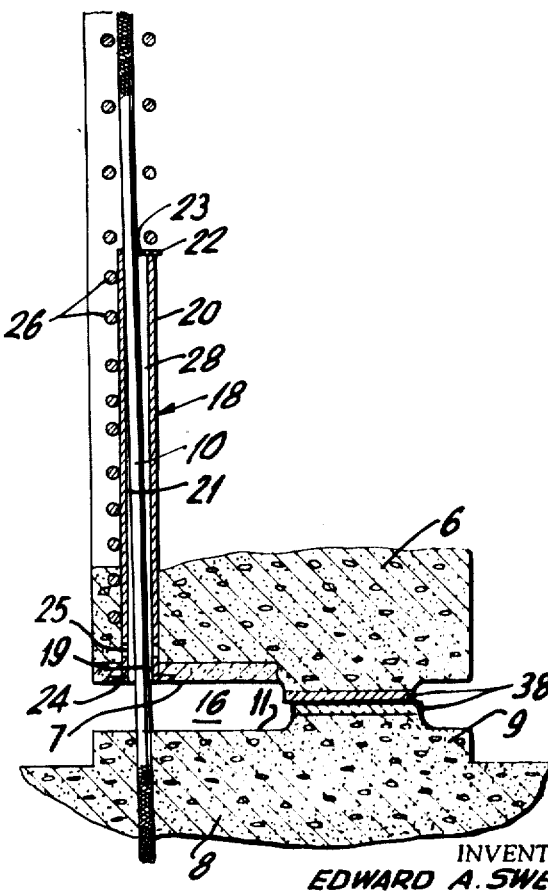
FIG. 6 is a sectional view of the reinforcement bar of FIG. 5 shown under vessel internal pressure load.

As seen in FIGS. 5 and 6, the vertical reinforcing bars 10 will not buckle under dead load. As the containment walls expand radially when subjected to an internal force, the portion of the vertical reinforcing bar 10 embedded in the mat 8 will remain fixed while the portion thereabove will be moved with the wall 6 as seen in FIG. 6. Consequently, the vertical reinforcement bars 10 will deflect in the zone of separation 16 and in the cavities 28 defined by the metal sleeves 18.

A variation of the basic connection design employs a sliding or rolling bearing mechanism within the zone of separation 16 to support the dead weight of the concrete wall 6, as seen in FIG. 6. Strategically located and designed mating plates 38 with Teflon (tetrafluorcethylene) coated surfaces have been found to be particularly suitable for service as the bearing members.

To construct the connection system of the present invention, the vertical and diagonal reinforcement bars 10 and 14 are set in position and the mat concrete is placed around them, thereby fixing the orientation of each reinforcing bar. In practice, it has been found desirable to provide the foundation mat 8 with a curb or foundation section 9 which extends above the mat. The height of the curb or foundation section 9 can vary depending on the application. The internal liner 12 is then erected. Next, the filler material, such as sand, is built up on the foundation section 9 of the foundation mat 8 to provide a base on which to pour the concrete for the containment wall 6. Sleeves 18 are then placed over the reinforcing bars 10 and 14 and will rest on the filler material without settling due to the flange 24. An outer form for the containment wall is arranged around the area in which the containment wall 6 is to be placed. A thin layer of concrete 40, seen in FIG. 2, is placed about the sleeves 18 to fix them in place. The thin layer 40 rests directly on the filler material. The position of the reinforcing bars 10 and 14 is next checked by examination through inspection hole 25. It is important that there be sufficient clearance between the reinforcement bars 10, 14 and the edge of the sleeve nearest the interior of the wall. The inspection hole 25 and the opening 23 in the sleeve cap 22 are sealed. In practice, it has been found that taping the holes 23 and 25 provides efficient sealing thereof. Horizontal reinforcing bars 26 are next placed to form an array of continuous circumferential rings. The containment wall outer form is then erected and concrete is placed to provide the containment wall with the configuration desired.

Finally, the filler material may be removed from the area between the mat and the containment wall and the outer form is removed.

Structurally, the design of the present invention provides a support assembly for a containment wall on which all of the loads are carried by the reinforcing bars. Because the wall is not restrained by the base mat, the wall can expand elastically in the radial direction with respect to the base when subjected to internal pressure. Therefore, shear stresses will not be developed, nor will large bending movements. Consequently, the need for reinforcing steel normally required to resist these stresses is eliminated. It results in material and construction time savings.

It should be noted that the connection system of the present invention has utility in any application wherein a vessel is subjected to internal pressure regardless of magnitude. Reinforced concrete storage tanks, prestressed concrete pressure vessels and granular storage containers are illustrative of the vessels wherein the present invention can be used. In addition, the invention finds use in membrane construction wherein it is desirable to eliminate the development of shear stresses normal to the membrane at the connections of various components such as roofs to walls and floors to walls.

The present invention has been described in the preferred embodiment as using vertical reinforcing bars to connect the concrete wall with the foundation section. It should be noted that the invention has application in prestressed concrete structures wherein tendons are used to connect the concrete wall with the foundation section. However, in the prestressed application the bearing members which are optional with the vertical reinforcing bars become necessary. Also, in the prestressed concrete structure the horizontal reinforcement may take the form of horizontal prestressed tendons or horizontal reinforcing bars.

I claim:
1. A structural connection for a nuclear containment vessel comprised of:
   a foundation mat;
   a cylindrically-shaped foundation section integrally formed with and extending upwardly from the foundation mat;
   a conically-shaped concrete containment wall section vertically aligned with the foundation section and displaced therefrom to define a zone of separation between the foundation section and the concrete containment wall section;
   a drywell head flange located on the upper inner surface of the containment wall section;
   a first array of vertically disposed reinforcing bars terminating in hooks which are embedded in the foundation mat and foundation section and which extend into and are embedded in the conically-shaped containment wall section in proximity to the outer surface thereof;
   a second array of vertically disposed reinforcing bars which are embedded in the foundation mat and foundation section and which extend into and are embedded in the conically-shaped containment wall section in proximity to the inner surface thereof wherein a portion of said second array of vertically disposed reinforcing bars extend to and attach to the drywell head flange;
   an array of diagonally disposed reinforcing bars which are embedded in the foundation mat and foundation section which extend into and are embedded in the containment wall section;
   sleeves extending from the bottom of the conical containment wall section to an intermediate position therein to define cavities to accommodate a portion of each reinforcing bar;
   bearings arranged on the cylindrical foundation section to support the conically-shaped concrete wall section;
   a metallic liner member conforming to the interior of the wall; and
   a horizontal array of reinforcing bars located within the wall.

References Cited

UNITED STATES PATENTS

| 2,435,345 | 2/1948 | Freyssinet | 52—224 |
| 2,690,074 | 9/1954 | Jones | 52—167 |
| 2,950,576 | 8/1960 | Rubenstein | 52—167 |
| 3,233,376 | 2/1966 | Naillon | 52—167 |
| 3,350,821 | 11/1967 | Jones | 52—167 |
| 3,397,503 | 8/1968 | Adler | 52—224 |
| 3,424,239 | 1/1969 | Coudray | 52—224 |

FOREIGN PATENTS

| 1,513,555 | 1968 | France | 52—167 |
| 800,388 | 1958 | Great Britain | 52—224 |
| 113,712 | 1945 | Sweden | 52—223 |

HENRY G. SUTHERLAND, Primary Examiner

U.S. Cl. X.R.

176—38, 87; 52—295